(12) United States Patent
Shiu et al.

(10) Patent No.: US 8,288,993 B2
(45) Date of Patent: Oct. 16, 2012

(54) BATTERY CHARGING CONTROLLER AND BATTERY BALANCE CHARGING CONTROLLER

(75) Inventors: Shian-Sung Shiu, Yonghe (TW); Chung-Che Yu, Yonghe (TW); Li-Min Lee, Yonghe (TW)

(73) Assignee: Green Solution Technology Co., Ltd., Taipei County (TW)

( * ) Notice: Subject to any disclaimer, the term of this patent is extended or adjusted under 35 U.S.C. 154(b) by 508 days.

(21) Appl. No.: 12/453,284

(22) Filed: May 6, 2009

(65) Prior Publication Data

US 2010/0141209 A1 Jun. 10, 2010

(30) Foreign Application Priority Data

Dec. 8, 2008 (TW) ................................ 97147575 A (51) Int. Cl.
*H02J 7/00* (2006.01)
(52) U.S. Cl. ......... 320/122; 320/116; 320/119; 320/120
(58) Field of Classification Search .................. 320/122
See application file for complete search history.

(56) References Cited

U.S. PATENT DOCUMENTS

| 4,238,721 | A | * | 12/1980 | DeLuca et al. | ................. | 320/122 |
| 2008/0088277 | A1 | * | 4/2008 | Wang et al. | ................... | 320/119 |
| 2009/0102421 | A1 | * | 4/2009 | Imai | .............................. | 320/118 |
| 2011/0298425 | A1 | * | 12/2011 | Liu et al. | ....................... | 320/118 |

FOREIGN PATENT DOCUMENTS

| JP | 2000-83327 | A | | 3/2000 |
| JP | 2001-292529 | | * | 10/2001 |
| JP | 2001-292529 | A | | 10/2001 |
| JP | 2005-318750 | A | | 11/2005 |

* cited by examiner

*Primary Examiner* — Edward Tso
*Assistant Examiner* — Ahmed Omar
(74) *Attorney, Agent, or Firm* — Rosenberg, Klein & Lee (57) ABSTRACT

The present invention discloses a battery charging controller for balancing the charged batteries. The battery charging controller comprises a battery reference voltage generator, a voltage balancing module and a balance judging circuit. The battery charging controller determines which one has the lower voltage between battery units of a battery module according to reference voltages generated by the battery reference voltage generator. The voltage balancing module controlled by the balance judging circuit allows the charging current of the lower-voltage battery larger than the charging current of the higher-voltage battery in such that the final voltages of the battery units are substantially equaled when they are completely saturated.

20 Claims, 6 Drawing Sheets

BATTERY CHARGING CONTROLLER AND BATTERY BALANCE CHARGING CONTROLLER

BACKGROUND OF THE INVENTION

1. Field of the Invention

The present invention relates to a battery charging controller and a battery balance charging controller, and more particularly to a battery charging controller for balancing a battery charge and a battery balance charging controller using the controller.

2. Description of Related Art

As portable electronic products are developed rapidly, the demand for rechargeable batteries becomes increasingly larger. Rechargeable batteries include the conventional Ni—Ca battery, Ni—H battery, and Li-ion battery as well as the recently developed Li-polymer battery. The voltage provided by different type of rechargeable battery varies, and the required operating voltages of the portable electronic products are different. Therefore, battery manufacturers usually connect several batteries in series to produce a battery module for providing a voltage capable of meeting the operating voltage requirement of the portable electronic products.

When the electric power of batteries of a battery module is exhausted, it is necessary to recharge the battery by a battery charger for the next time of use. However, the battery capacity is different due to mismatch in manufacture and application. For example, a 7.4V lithium battery module is formed by connecting two pieces of 3.7V lithium batteries in series. For factory default setting, the electric power storage capacities of the two pieces of batteries are 80% and 70% respectively. Since the lithium batteries will be damaged if they are overcharged, therefore the lithium battery charger will stop charging the battery module as soon as any one of the lithium batteries therein is fully charged. Now, the electric power storage capacities of the two batteries are 100% (maximum level of a battery charge) and 90% respectively. The battery module can be used until the electric power storage capacity of any one of the batteries therein drops to 0% (minimum level of a battery discharge). Therefore, it is necessary recharge the battery module for a further use when the electric power storage capacities of the two batteries drop to 10% and 0% respectively.

From the description of the aforementioned example, the electric power storage capacities of batteries in a battery module are different, and thus the actual use of electric power storage capacity of the battery module is determined by the battery with the lowest electric power storage capacity. In addition to the variation of factory default electric power storage capacity of each battery of a battery module, a battery also self-discharges electric power, when the battery is not in use. Since each battery self-discharges electric power at a different rate, therefore an unbalanced electric power storage capacity will result among the batteries, and the usable capacity of the battery module is reduced as the using time of the battery increases, and the efficiency of using battery module becomes lower, and the using time of the battery module from fully charged to empty becomes shorter.

Figure 1:
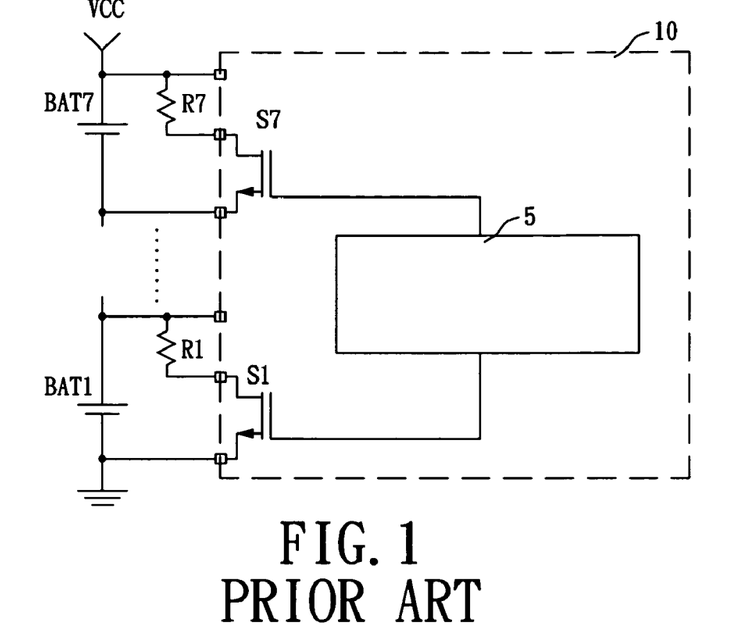
FIG. 1 is a schematic circuit diagram of a conventional digital battery balancing controller.

With reference to FIG. 1 for a schematic circuit diagram of a digital battery balancing controller disclosed in a datasheet of the Intersil ISL9208 product, a digital battery balancing controller 10 comprises a battery balance microprocessor 5 and a plurality of transistor switches S1-S7. The transistor switches S1-S7 are connected with a plurality of batteries BAT1-BAT7 in parallel through a plurality of resistors R1-R7 respectively. The voltage of the batteries BAT1-BAT7 is converted into a digital signal through an analog-to-digital converter (A/D converter), and the battery balancing controller 5 determines a higher-voltage battery by a built-in algorithm according to the digital signal of the voltage of the batteries BAT1-BAT7 and conducts the transistor switch connected in parallel to the higher-voltage battery, such that the charging current of each battery can be adjusted according to the voltage of each battery to achieve a balanced charging function. However, the voltage of each battery must be converted into a digital signal by an analog-to-digital converter before the digital battery balancing controller 5 processes, and the analog-to-digital converter increases the chip area 10 of the digital battery balancing controller 10 significantly and incurs a high cost. In addition, the digital battery balancing controller 5 is restricted by its design, such as the ISL9208 chip can support a battery module composed of 5 to 7 pieces of batteries only, and the scope of applicability is limited.

SUMMARY OF THE INVENTION

In view of the high cost of the conventional digital battery balancing controller, the present invention adopts an analog battery charging controller to achieve a balanced charge of batteries. Since the determining circuit of the analog controller comes with an area smaller than that of the analog-to-digital converter, the cost is lower, and the controller can be applied to a battery module composed of any number of batteries to give a broad scope of applicability.

Therefore, the primary objective of the present invention is to achieve the foregoing advantages by providing a battery balanced charging controller, for balancing a battery change of a first battery and a second battery, and a negative terminal of the first battery being electrically coupled to a positive terminal of the second battery to form a connecting point, and a positive terminal of the first battery forming a first terminal, and a negative terminal of the second battery forming a second terminal. The battery balanced charging controller comprises a battery reference voltage generator, a voltage balance module, and a balance judgment circuit. The battery reference voltage generator is coupled between the first terminal and the second terminal, for providing a first series of battery balance judgment signals and a second series of battery balance judgment signals. The first series of battery balance judgment signals comprises a high-plus reference signal and the second series of battery balance judgment signals comprises a low-minus reference signal, wherein a level of the high-plus reference signal is higher than that of the low-minus reference signal. The voltage balance module comprises a first balance current unit and a second balance current unit, the first balance current unit is coupled to the first terminal and the connecting point, and the second balance current unit is coupled to the second terminal and the connecting point. The balance judgment circuit is coupled to the connecting point, the battery reference voltage generator and the voltage balance module, and determines whether enters a first condition or a second condition according to the first series of battery balance judgment signals, the second series of battery balance judgment signals and the voltage level of the connecting point. Wherein, the voltage balance module provides a balance current to the first battery or the second battery which having the lower voltage when the balance judgment circuit is under the first condition.

The present invention also provides a battery charging controller for charging a battery module with a plurality of battery units, the battery charging controller coupled to a positive terminal and a negative terminal of each battery units. The battery charging controller comprises a battery charging controlling unit and a battery balanced charging controlling unit. The battery charging controlling unit determines an amount of a charging current and generates an enable signal according to a battery current detecting signal and a battery voltage detecting signal. The battery balanced charging controlling unit is coupled to the battery charging controlling unit and a positive terminal and a negative terminal of each battery unit of the battery module. The battery balanced charging controlling unit determines whether modulating the amount of the charging current flowing through any N series battery units in the battery module according to voltages of the N series battery units when receiving the enable signal to cause that the charging current flowing through a battery unit with the lowest voltage of the N series battery units is larger than that flowing through a battery unit with the highest voltage thereof, wherein N is an integer greater than zero.

The present invention further provides a battery balanced charging controller, for modulating charging currents flowing through a plurality of series battery units of a battery module. The battery balanced charging controller comprises a battery reference voltage generator, a voltage balance module, and a balance judgment circuit. The battery reference voltage generator is coupled to positive terminals and negative terminals of the plurality of battery units for providing plural series of battery balance judgment signals. The voltage balance module is coupled to connecting points of every two battery units, a positive terminal and a negative terminal of the battery module. The balance judgment circuit is coupled to the connecting points, the battery reference voltage generator and the voltage balance module, and determines whether modulating the charging current of each battery unit according to the voltage levels of the connecting points and the plural series of battery balance judgment signals.

The above and other objects, features and advantages of the present invention will become apparent from the following detailed description taken with the accompanying drawing.

DETAILED DESCRIPTION OF THE PREFERRED EMBODIMENTS

Figure 2A:
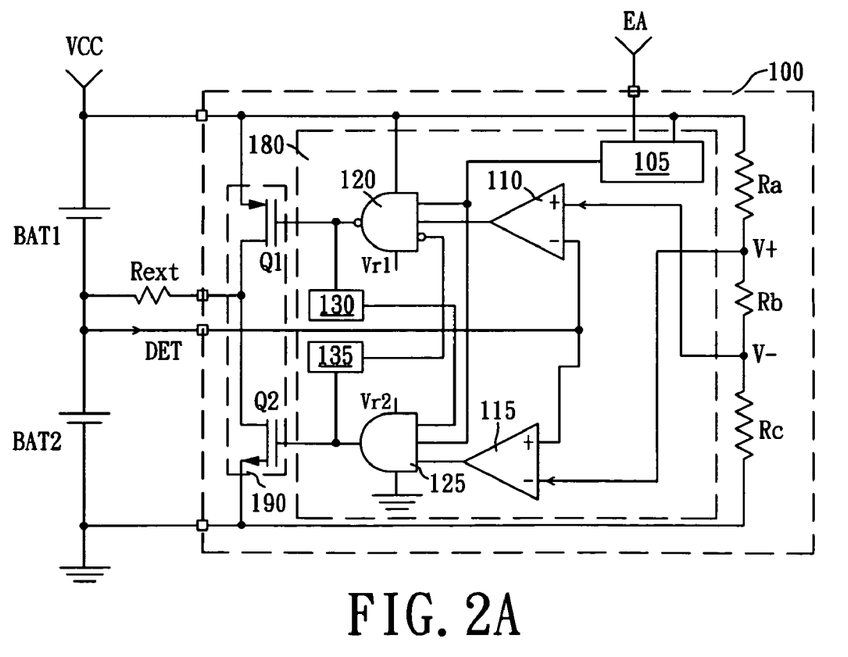
FIG. 2A is a schematic circuit diagram of a battery balanced charging controller in accordance with a first preferred embodiment of the present invention.

Please refer FIG. 2A, FIG. 2A is a schematic circuit diagram of a battery balanced charging controller in accordance with a first preferred embodiment of the present invention. The battery balanced charging controller 100 is applied to balance a battery change of a first battery BAT1 and a second battery BAT2. A negative terminal of the first battery BAT1 is electrically coupled to a positive terminal of the second battery BAT2 to form a connecting point, a positive terminal of the first battery BAT1 forms a first terminal, and a negative terminal of the second battery BAT2 forms a second terminal. The battery balanced charging controller 100 comprises a reference voltage generator having a first resistor Ra, a second resistor Rb and a third resistor Rc, a balance judgment circuit 180, and a voltage balance module 190. One end of the first resistor Ra is coupled to a positive terminal of the first battery BAT1, and one end of the third resistor Rc is coupled to a negative terminal of the second battery BAT2. One end of the second resistor Rb is coupled the other end of the first resistor Ra to generate a high reference signal V+ and the other end of the second resistor Rb is coupled the other end of the third resistor Rc to generate a low reference signal V−, wherein the resistance values of the first resistor Ra and the third resistor Rc are the same and the resistance values of the second resistor Rb is smaller than that of the first resistor Ra, preferably Ra:Rb:Rc=100:1:100. The voltage balance module 190 comprises a first balance current unit and a second balance current unit. The first balance current unit is coupled to the first terminal and the connecting point and the second balance current unit is coupled to the second terminal and the connecting point for providing a balance current flowing through the first balance current unit or the second balance current unit. The first balance current unit comprises a first switch Q1 and the second balance current unit comprises a second switch Q2. The first switch Q1 is coupled to the positive terminal of the first battery BAT1 and the connecting point and the second switch Q2 is coupled to the negative terminal of the second battery BAT2 and the connecting point. For limiting the current flowing through the first switch Q1 or the second switch Q2, the first switch Q1 and the second switch Q2 are preferred to be coupled to the connecting point via a resistor Rext and so the charging current is limited for avoiding damaging the batteries BAT1, BAT2 or over-temperature of the battery balanced charging controller 100.

The balance judgment circuit 180 is coupled between the battery reference voltage generator and the voltage balance module 190. The balance judgment circuit 180 comprises a first comparator 110, a second comparator 115, a NAND gate 120, and an AND gate 125. A non-inverting terminal of the first comparator 110 is coupled to a connection of the second resistor Rb and a third resistor Rc, and an inverting terminal thereof is coupled to a connecting point of the first battery BAT1 and the second battery BAT2. An inverting terminal of the second comparator 115 is coupled to a connection of the second resistor Rb and a first resistor Ra, and a non-inverting terminal thereof is coupled to a connecting point of the first battery BAT1 and the second battery BAT2.

For ensuring the battery balanced charging controller 100 operating normally, the battery balanced charging controller 100 might further comprise a processing unit 105. The processing unit 105 comprises an over-temperature protecting unit, an under-voltage lockout (UVLO) unit and an enable detecting unit. The over-temperature protecting unit detects a temperature of the battery balanced charging controller 100, and generates an over-temperature signal when the temperature is over a predetermined protecting temperature for preventing an over-temperature condition. The UVLO unit is coupled to the positive terminal of the first battery BAT1 and the negative terminal of the second battery BAT2, and generates an under-voltage signal when the voltage difference there between is lower than a predetermined enable voltage for avoiding the battery balanced charging controller 100 operating abnormally. The enable detecting unit starts the battery balanced charging controller 100 after receiving an enable signal EA of high level so as to ensure the battery balanced charging controller 100 operating under the first battery BAT1 and the second battery BAT2 entering into charging condition. Inner circuits inside the battery balanced charging controller 100 are off and so almost not consuming any power when not receiving the enable signal EA (or receiving the enable signal EA of low level). Hence, the battery balanced charging controller 100 has the advantage of saving energy.

The NAND gate 120 is coupled to the processing unit 105 and the first comparator 110, and controls the switching of the first switch Q1 according to outputted signals of the processing unit 105 and the first comparator 110. For avoiding damaging the first switch Q1 due to the outputted signal of the NAND gate 120 being too low, the NAND gate 120 could be coupled to a voltage Vr1 higher than the voltage at the negative terminal of the second battery BAT2 to avoid outputting a signal with too low voltage level. The AND gate 125 is coupled to the processing unit 105 and the second comparator 115, and controls the switching of the second switch Q2 according to outputted signals of the processing unit 105 and the second comparator 115. For avoiding damaging the second switch Q2 due to the outputted signal of the NAND gate 120 being too high, the NAND gate 120 could be coupled to a voltage Vr2 lower than the voltage at the positive terminal of the first battery BAT1 to avoid outputting a signal with too high voltage level. Besides, for avoiding the first switch Q1 and the second switch Q2 be flowed through too larger current due to simultaneously being turned ON, the battery balanced charging controller 100 could comprise a time delay unit, coupled to the balance judgment circuit 180 and the voltage balance module 190 to ensure that one of the first switch Q1 and the second switch Q2 is conducted after a predetermined time period from the other being cutoff.

The operation of the battery balanced charging controller 100 is described as follows. When the enable signal EA is high level, indicative of the first battery BAT1 and the second battery BAT2 entering into the charging condition, the processing unit 105 determines whether any abnormal condition occurring, e.g.: the voltage difference of the first terminal and the second terminal of the battery module (i.e. the positive terminal of the first battery BAT1 and the negative terminal of the second battery BAT2) is lower than the predetermined enable voltage, the temperature of the battery balanced charging controller 100 is too high than, and so on. The battery balanced charging controller 100 operates normal, the processing unit 105 generates a signal with high level to start the battery balanced charging controller 100 operating, else the processing unit 105 generates a signal with low level to stop the battery balanced charging controller 100 operating.

Assumed that both of the first battery BAT1 and second battery BAT2 are lithium batteries, and the rated voltage is 3.7V, and the fully charged voltage is 4.2V, and the voltages of the first battery BAT1 and the second battery BAT2 are 2.8V and 2.5V before being charged. When the battery module is plugged into a charging socket, the voltage supplied by the battery module is 5.3V (=2.8V+2.5V), and thus the high reference signal V+ is 5.3V*(Rb+Rc)/(Ra+Rb+Rc)☐2.663V, and the low reference signal V− is 5.3V*Rc/(Ra+Rb+Rc) ☐2.639V, where Ra:Rb:Rc=100:1:100. Now, a voltage signal DET at the connecting point of the first battery BAT1 and the second battery BAT2 is 2.5V, and the first comparator 110 outputs a first comparison signal with high level and the second comparator 115 outputs a second comparison signal with low level. Without any abnormal condition, the processing unit 105 also outputs a signal with high level, such that the AND gate 125 outputs a signal with low level to turn off the second switch Q2 (which is a n-type MOSFET in this embodiment), and the NAND gate 120 outputs a signal with low level to turn on the first switch Q1 (which is a p-type MOSFET in this embodiment) for passing a balanced charging current through the first switch Q1. The second battery BAT2 having a lower voltage receives a charging current greater than the charging current received by the first battery BAT1 having a higher voltage by an additional balanced charging current, so that the battery voltages of the two batteries can become closer during the charging process. In the example above, if the voltage signal DET of the connecting point is lower than the low reference signal V−, the balanced charging current will pass through the first switch Q1, and if voltage signal DET of the connecting point is higher than the high reference signal V+, indicating that the battery voltage of the first battery is lower, the balanced charging current will pass through the second switch Q2.

Since the present invention divides a voltage by using a resistor, a reference voltage is generated according to the ratio of the impedances of the resistors to determine whether or not it is necessary to perform a balanced charging operation by the balanced charging current. If the voltage difference between the first battery BAT1 and the first battery BAT2 is lower than a predetermined percentage, the battery balanced charging controller 100 will turn off the first switch Q1 and the second switch Q2. In the aforementioned example, the predetermined percentage is 1%.

During the processing of charging the first battery BAT1 and the second battery BAT2, if the enable signal EA to be changed into a low potential level or an abnormal condition occurs (such as the balanced charging current passes through the voltage balance module 190 or other factors causing the battery balanced charging controller 100 to have a temperature higher than a predetermined over-temperature protection point or the operating voltage of the battery balanced charging controller 100 is lower than a predetermined starting voltage), the processing unit 105 will output a signal with low level to stop the operation of the battery balanced charging controller 100 until the foregoing condition is removed. Since a noise of the circuit may causes the voltage signal DET of the connecting point varying to be lower than the low reference signal V− and higher than the high reference signal V+, both the first switch Q1 and the second switch Q2 will be turned on at the same time. Therefore, the battery balanced charging controller 100 could install inside a time delay unit comprising a first time delay device 130 and a second time delay device 135 to avoid the issue of both of the first switch Q1 and the second switch Q2 being conducted at the same time. If the NAND gate 120 outputs a signal with low level to turn on the first switch Q1, while driving the AND gate 125 to output a signal with low level to turn off the second switch Q2, the AND gate 125 will be able to output a high potential level signal to turn on the second switch Q2 until the first delay device 130 receives a signal with high level output by the NAND gate 120 and outputs a signal with high level after a predetermined delay time from receiving. Similarly, if the AND gate 125 outputs a signal with high level to turn on the second switch Q2, while driving the NAND gate 120 to output a signal with high level to turn off the first switch Q1, the NAND gate 120 will be able to output a low potential level signal to turn on the first switch Q1 until the second time delay device 135 receives a signal with low level output by the AND gate 125 and outputs a signal with low level after a predetermined delay time from receiving. With the foregoing arrangement, we can assure that one of the first switch Q1 and the second switch Q2 is conducted after a predetermined time interval from the other of the first switch Q1 and the second switch Q2 being cutoff, so as to avoid the issue of both switches being conducted at the same time.

Figure 2B:
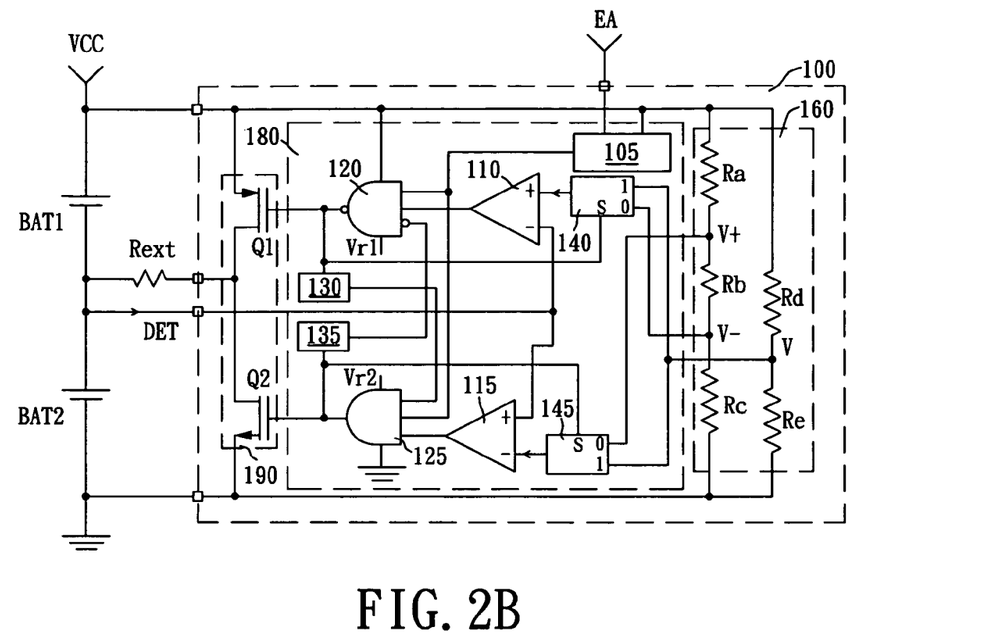
FIG. 2B is a schematic circuit diagram of a battery balanced charging controller in accordance with second preferred embodiment of the present invention.

Please refer FIG. 2B, FIG. 2B is a schematic circuit diagram of a battery balanced charging controller in accordance with second preferred embodiment of the present invention for that the voltages of batteries of the battery module are closer. Compared with the embodiment shown in FIG. 2A, the battery balanced charging controller 100 further comprises a first multiplexer 140 and a second multiplexer 145. Additionally, a fourth resistor Rd and fifth resistor Re are added and are formed a battery reference voltage generator 160 with the first resistor Ra, the second resistor Rb and the third resistor Rc. The fourth resistor Rd and the fifth resistor Re are connected in series between the positive terminal of the first battery BAT1 and the negative terminal of the second battery BAT2 and generates a balancing reference signal V in the connected point thereof. The resistance values of the fourth resistor Rd and the fifth resistor Re are the same and so the balancing reference signal V is equal to the average voltage of the first battery BAT1 and the second battery BAT2.

The high reference signal V+ and the balancing reference signal V are transmitted to the inputs of the second multiplexer 145, and the low reference signal V− and the balancing reference signal V are transmitted to the inputs of the first multiplexer 140. The selecting terminal S of the second multiplexer 145 receives the outputted of the AND gate 125, and the output thereof is coupled to the inverting terminal of the second comparator 115. The second multiplexer 145 selectively outputs the balancing reference signal V when the outputted signals of the AND gate 125 is high level, or selectively outputs the high reference signal V+ when the outputted signals of the AND gate 125 is low level. The selecting terminal S of the first multiplexer 140 receives the outputted of the NAND gate 120, and the output thereof is coupled to the inverting terminal of the first comparator 110. The first multiplexer 140 selectively outputs the balancing reference signal V when the outputted signals of the NAND gate 120 is high level, or selectively outputs the low reference signal V− when the outputted signals of the NAND gate 120 is low level.

When the battery balanced charging controller 100 operates and the voltage signal DET at the connecting point is higher than the high reference signal V+, the second switch Q2 is turned on to pass the balance current and the second multiplexer 145 selectively outputs the balancing reference signal V. Hence, the second comparator 115 compares the voltage signal DET with the balancing reference signal V until the voltage signal DET decreases lower than the balancing reference signal V. When the voltage signal DET decreases to be lower than the balancing reference signal V, the second multiplexer 145 selectively outputs the high reference signal V+ and so the second comparator 115 becomes to compare the voltage signal DET with the high reference signal V+.

In addition, when the battery balanced charging controller 100 operates and the voltage signal DET is lower than the low reference signal V−, the first switch Q1 is turned on to pass the balance current and the first multiplexer 140 selectively outputs the balancing reference signal V. Hence, the first comparator 110 compares the voltage signal DET with the balancing reference signal V until the voltage signal DET increases higher than the balancing reference signal V. When the voltage signal DET increases to be higher than the balancing reference signal V, the first multiplexer 140 selectively outputs the low reference signal V− and so the first comparator 110 becomes to compare the voltage signal DET with the low reference signal V−.

Figure 3:
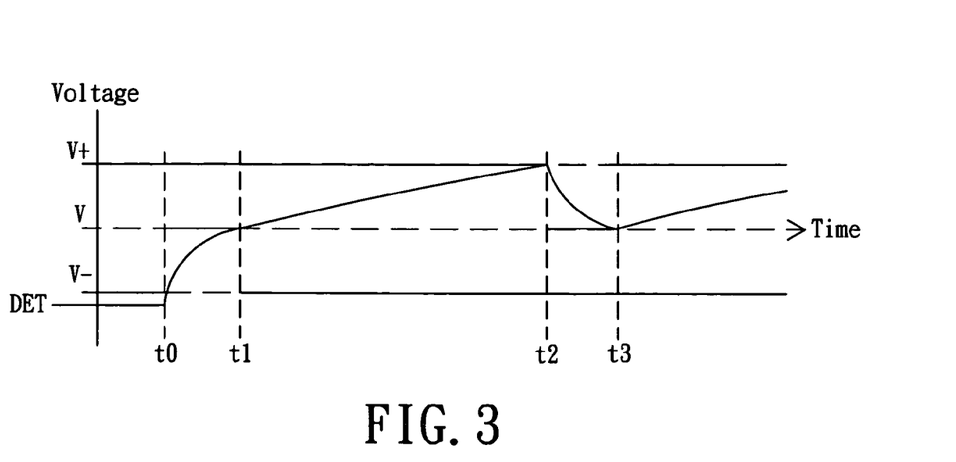
FIG. 3 is a relationship diagram of battery balance judgment signals and the voltage of batteries.

Please refer FIG. 3, FIG. 3 is a relationship diagram of battery balance judgment signals and the voltage of batteries, wherein the black real line represents reference levels for judging whether performing the battery balanced charging when the battery balanced charging controller 100 operates. The battery balanced charging controller 100 starts at the time point t0. At this time, an upper reference level and a lower reference level are respectively the high reference signal V+ and low reference signal V−. Because the initial level of the voltage signal DET is lower than the low reference signal V−, the upper reference level and the lower reference level becomes the high reference signal V+ and balancing reference signal V respectively. Next, The level of the voltage signal V will increase due to battery balanced charging, and reach the level of the balancing reference signal V at the time point t1 and the battery balanced charging controller 100 will stop the process of battery balanced charging. At this time, the upper reference level and the lower reference level return to become the high reference signal V+ and the low reference signal V−. However, the voltage signal V gradually increases due to an unbalance condition of the charging process and reaches the level of the high reference signal V+ at the time point t2. At this time, the battery balanced charging controller 100 performs the process of battery balanced charging once again, and the upper reference level and lower reference level becomes the balancing reference signal V and the low reference signal V−. The voltage signal V will be closer to the balancing reference signal V and come back to the balancing reference signal V at the time point t3. At this time, the battery balanced charging controller 100 stops the process of battery balanced charging again and the upper reference level and the lower reference level return to become the high reference signal V+ and the low reference signal V−.

Therefore, as mentioned above, when the voltage signal DET at the connecting point is higher than the high reference signal V+ or lower than the low reference signal V− (i.e.: the voltage difference between the first battery BAT1 and the second battery BAT2 is higher than a predetermined percentage), the battery balanced charging controller 100 operates under a first condition to conduct a balance current to the lower voltage of the first battery BAT1 and the second battery BAT2 (i.e.: the battery with the lower voltage being charged with a higher charging current) until the battery voltages are the same. When the voltage signal DET is between the high reference signal V+ and the low reference signal V− (i.e.: the voltage difference between the first battery BAT1 and the second battery BAT2 is lower than a predetermined percentage), the battery balanced charging controller 100 operates under a second condition to stop conducting the balance current.

In the embodiments above, the judgment of battery balanced charging of the first battery BAT1 and the second battery BAT2 are respectively based on the high reference signal V+ and the balancing reference signal V (a first series of battery balance judgment signals), and the balancing reference signal V and the low reference signal V− (a second series of battery balance judgment signals), wherein the first series of battery balance judgment signals and the second series of battery balance judgment signals have simultaneously the balancing reference signal V. In practice, the first series of battery balance judgment signals and the second series of battery balance judgment signals might have difference judgment signals to avoid erroneous judgments.

Figure 4:
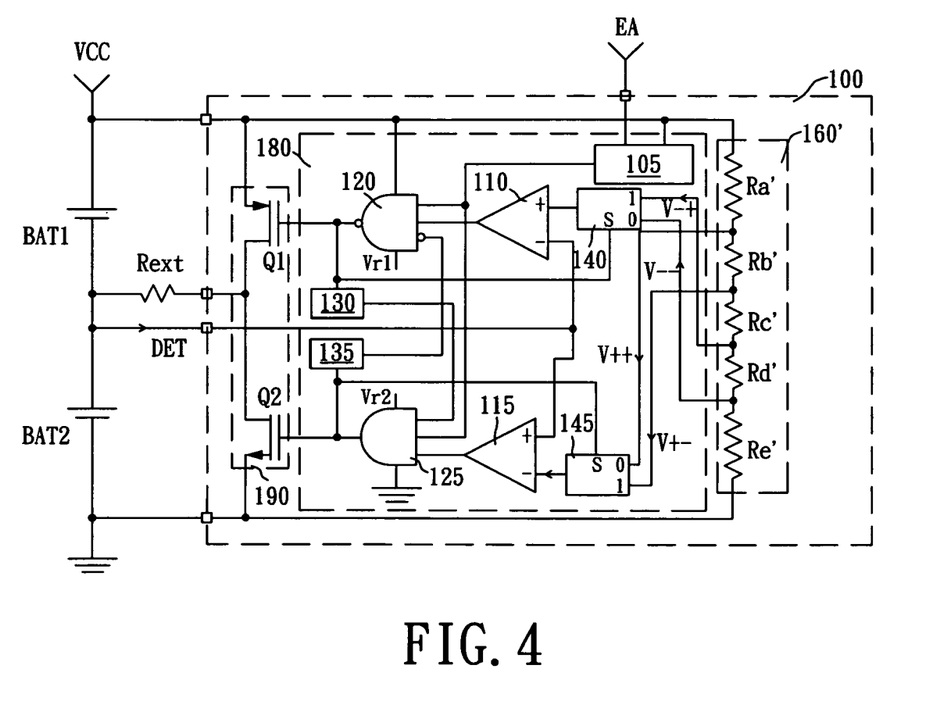
FIG. 4 is a schematic circuit diagram of a battery balanced charging controller in accordance with third preferred embodiment of the present invention.

Please refer FIG. 4, FIG. 4 is a schematic circuit diagram of a battery balanced charging controller in accordance with third preferred embodiment of the present invention. Compared with the embodiment shown in FIG. 2A, the first series of battery balance judgment signals comprises a high-plus reference signal V++ and a low-plus reference signal V+−, and the second series of battery balance judgment signals comprises a high-minus reference signal V−+ and low-minus reference signal V−−, wherein the high-plus reference signal V++ is higher than the low-plus reference signal V+− and the high-minus reference signal V−+ is higher than the low-minus reference signal V−−. Preferably, the low-plus reference signal V+− furthermore is higher than the high-minus reference signal V−+. A battery reference voltage generator 160' comprises resistors Ra'、Rb'、Rc'、Rd'、Re', for generating the high-plus reference signal V++, the low-plus reference signal V+−, the high-minus reference signal V−+, and the low-minus reference signal V−−. The input of the first multiplexer 140 receives the high-minus reference signal V−+ and the low-minus reference signal V−−, the selecting terminal S thereof is coupled to the output of the NAND gate 120, and the output thereof is coupled to the non-inverting terminal of the first comparator 110. The inverting terminal of the first comparator 110 receives the voltage signal DET and turns on the first switch Q1 when the voltage signal DET is lower than the low-minus reference signal V−− for conducting a balance current to the second battery BAT2 until the voltage signal DET increases to the level of the high-minus reference signal V−+. The input of the second multiplexer 145 receives the high-plus reference signal V++ and the low-plus reference signal V+−, the selecting terminal S thereof is coupled to the output of the AND gate 125, and the output thereof is coupled to the inverting terminal of the second comparator 115. The non-inverting terminal of the second comparator 115 receives the voltage signal DET and turns on the second switch Q2 when the voltage signal DET is higher than the high-plus reference signal V++ for conducting a balance current to the first battery BAT1 until the voltage signal DET decreases to the level of the low-plus reference signal V+−.

The battery balanced charging controller 100 according to the present invention could be applied to not only two serially battery, but three or more serially battery for battery balanced charging. If the battery module includes (N+1) serially connected battery units, N battery balanced charging controllers will be used, so that any two connected battery units has a corresponding battery balanced charging controller to determine whether performing batter y balanced charging according to corresponding a series of battery balance judgment signals generated by battery reference voltage generator. Every series of battery balance judgment signals has at least one battery balance judgment signal, preferably a plurality of battery balance judgment signal. Moreover, every series of battery balance judgment signals could has the same signal(s).

Figure 5:
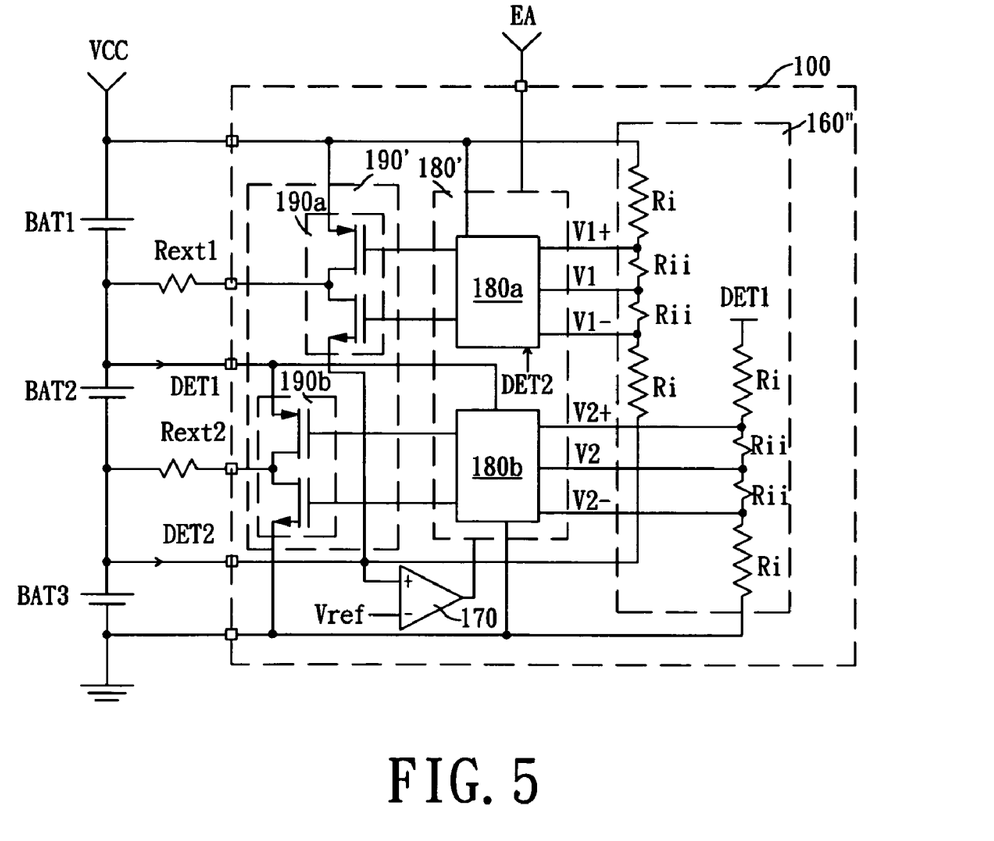
FIG. 5 is a schematic circuit diagram of a battery balanced charging controller in accordance with fourth preferred embodiment of the present invention.

Please refer FIG. 5, FIG. 5 is a schematic circuit diagram of a battery balanced charging controller in accordance with fourth preferred embodiment of the present invention. The battery balanced charging controller 100 comprises a battery reference voltage generator 160", a balance judgment circuit 180' and a voltage balance module 190', for balance charging among the first battery BAT1, the second battery BAT2, and third battery BAT3 serially connected. The battery reference voltage generator 160" is coupled to the positive terminal of the first battery BAT1, the negative terminal of the third battery BAT3, the connecting point of the first battery BAT1 and the second battery BAT2 for receiving a voltage signal DET1, and the connecting point of the second battery BAT2 and the third battery BAT3 for receiving a voltage signal DET2. The battery reference voltage generator 160" comprises a first resistor series and a second resistor series, composed by two resistor Ri and two resistor Rii, wherein the resistance value of the resistor Ri is larger than that of the resistor Rii (e.g. Ri:Rii=100:1). The first resistor series is connected between the positive terminal of the first battery BAT1 and the connecting point of the second battery BAT2 and the third battery BAT3, for providing a first high reference signal V1+, a first low reference signal V1− and a first balancing reference signal V1. The second resistor series is connected between the negative terminal of the third battery BAT3 and the connecting point of the second battery BAT2 and the first battery BAT1, for providing a second high reference signal V2+, a second low reference signal V2− and a second balancing reference signal V2. Wherein, the first series of battery balance judgment signals comprises the first high reference signal V1+ and the first balancing reference signal V1, the second series of battery balance judgment signals comprises the first low reference signal V1− and the first balancing reference signal V1, the third series of battery balance judgment signals comprises the second high reference signal V2+ and the second balancing reference signal V2, and the fourth series of battery balance judgment signals comprises the second low reference signal V2− and the second balancing reference signal V2. The balance judgment circuit 180' comprises a first balance judgment circuit unit 180 and a second balance judgment circuit unit 180b. The voltage balance module 190' comprises a first voltage balance unit 190a and a second voltage balance unit 190b. The first voltage balance unit 190a is coupled to the positive terminal of the first battery BAT1 and the connecting point of the second battery BAT2 and the third battery BAT3, and coupled to the connecting point of the first battery BAT 1 and the second battery BAT2 via a resistor Rext1. The second voltage balance unit 190b is coupled to the negative terminal of the third battery BAT3 and the connecting point of the second battery BAT2 and the first battery BAT1, and coupled to the connecting point of the third battery BAT3 and the second battery BAT2 via a resistor Rext2.

The first balance judgment circuit unit 180a is coupled to the positive terminal of the first battery BAT1 and the connecting point of the second battery BAT2 and the third battery BAT3, and controls the first voltage balance unit 190a according to the first high reference signal V1+, the first low reference signal V1−, and the first balancing reference signal V1 to determine whether the balance current is conducted via the resistor Rext1 (to the first battery BAT1 or the second battery BAT2). The second balance judgment circuit unit 180b is coupled to the negative terminal of the third battery BAT3 and the connecting point of the second battery BAT2 and the first battery BAT1, and controls the second voltage balance unit 190b according to the second high reference signal V2+, the second low reference signal V2−, and the second balancing reference signal V2 to determine whether conducting the balance current via the resistor Rext2 (to the second battery BAT2 or the third battery BAT3). Therefore, the balance judgment circuit 180' determines and controls the voltage balance module 190' to charge one of the three batteries BAT1, BAT2, BAT3, which having the lower voltage, with the extra balance current. Hence, the lowest voltage of the three batteries BAT1, BAT2, BAT3 is charged with a charging current larger than charging currents to other two batteries until that the voltage differences among the three batteries BAT1, BAT2, BAT3 are within a predetermined percentage.

Moreover, the battery balanced charging controller 100 could further comprise a protection comparator 170, in which a non-inverting terminal thereof receives the voltage signal DET2 and an inverting terminal thereof receives a reference voltage Vref. The reference voltage Vref is bigger than 0V, but smaller than a lowest voltage of general battery, e.g.: 0.5V. Hence, the battery balanced charging controller 100 could be shut down by grounding the non-inverting terminal of the protection comparator 170.

Figure 6:
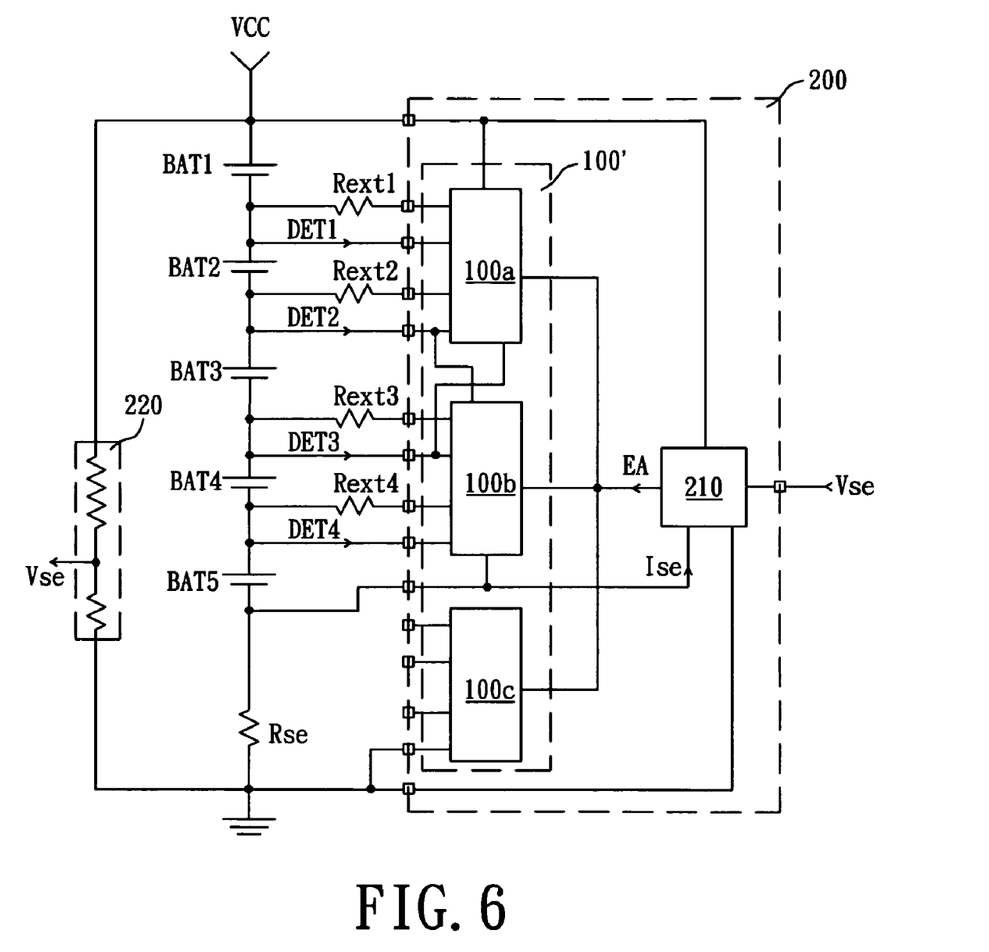
FIG. 6 is a schematic circuit diagram of a battery charging controller with a built-in battery balanced charging controller of the present invention.

The battery balanced charging controller of the present invention might be built-in a battery charging controller in the conventional arts. Please refer FIG. 6, FIG. 6 is a schematic circuit diagram of a battery charging controller with a built-in battery balanced charging controller of the present invention. The battery charging controller 200 is coupled to positive and negative terminals of a plurality of batteries in the battery module. The battery module comprises a first battery BAT1, a second battery BAT2, a third battery BAT3, a fourth battery BAT4, and a fifth battery BAT5. The battery charging controller 200 comprises a battery balanced charging control unit 100' and a battery charging control unit 210. In the embodiment, the battery balanced charging control unit 100' comprises a plurality of battery balanced charging controllers, as shown in FIG. 5, which are a first battery balanced charging controller 10*a*, a second battery balanced charging controller 100*b*, and a third battery balanced charging controller 100*c*. The first battery balanced charging controller 100*a* is used to balance the charging among the first battery BAT1, the second battery BAT2, and the third battery BAT3. The second battery balanced charging controller 100*b* is used to balance the charging among, the third battery BAT3, the fourth battery BAT4, and the fifth battery BAT5. The third battery balanced charging controller 100*c* is grounded and does not function.

The battery charging control unit 210 might be a battery charging controller in the conventional arts, controlling the charging process according to a voltage detecting signal Vse generated by a voltage detector 220 and a current detecting signal Ise generated by a current detecting resistor Rse. The common charging method comprises CC/CV (constant current/constant voltage) charging method, CV/CC charging method, and so on. The process in these charging methods can be classified into a first charging mode of fast-charging, and a second charging mode of trickle-charging. In the first mode, the battery charging control unit 210 controls to provide a charging current larger than that in the second charging mode to rapidly charge the battery module. For example, in the CV/CC charging method, the constant voltage mode is the first charging mode and the constant current mode is the second charging mode; in the CC/CV charging method, the constant current mode is the first charging mode and the constant voltage mode is the second charging mode.

The battery charging control unit 210 generates an enable signal EA to enable the battery balanced charging control unit 100' for battery balanced charging according to the charging condition in the charging process. If any abnormal condition occurring, e.g.: over-temperature, short-circuit, open-circuit, the battery charging control unit 210 could stops generating the enable signal EA to terminate the battery balanced charging control unit 100' operating. Alternatively, the battery charging control unit 210 generates the enable signal EA only in a specific charging mode according to the charging characteristics in different phases of different charging method.

When receiving the enable signal EA, the first battery balanced charging controller 100*a* and the second battery balanced charging controller 100*b* starts to perform the process of battery balanced charging and modifies the charging currents for the plurality of batteries in the battery module when one of the voltage differences among the plurality of batteries is larger than a predetermined percentage, and so the batteries will have the same battery voltage. In the embodiment, because the third battery is detected and controlled with battery balanced charging by the first battery balanced charging controller 100*a* and the second battery balanced charging controller 100*b* simultaneously, the first battery BAT1, the second battery BAT2, the third battery BAT3, the fourth battery BAT4, and the fifth battery BAT5 eventually have the same battery voltage. Of course, no battery is detected simultaneously by two or more battery balanced charging controller, the battery balanced charging controllers still have the function of battery balanced charging for the corresponding batteries.

Figure 7:
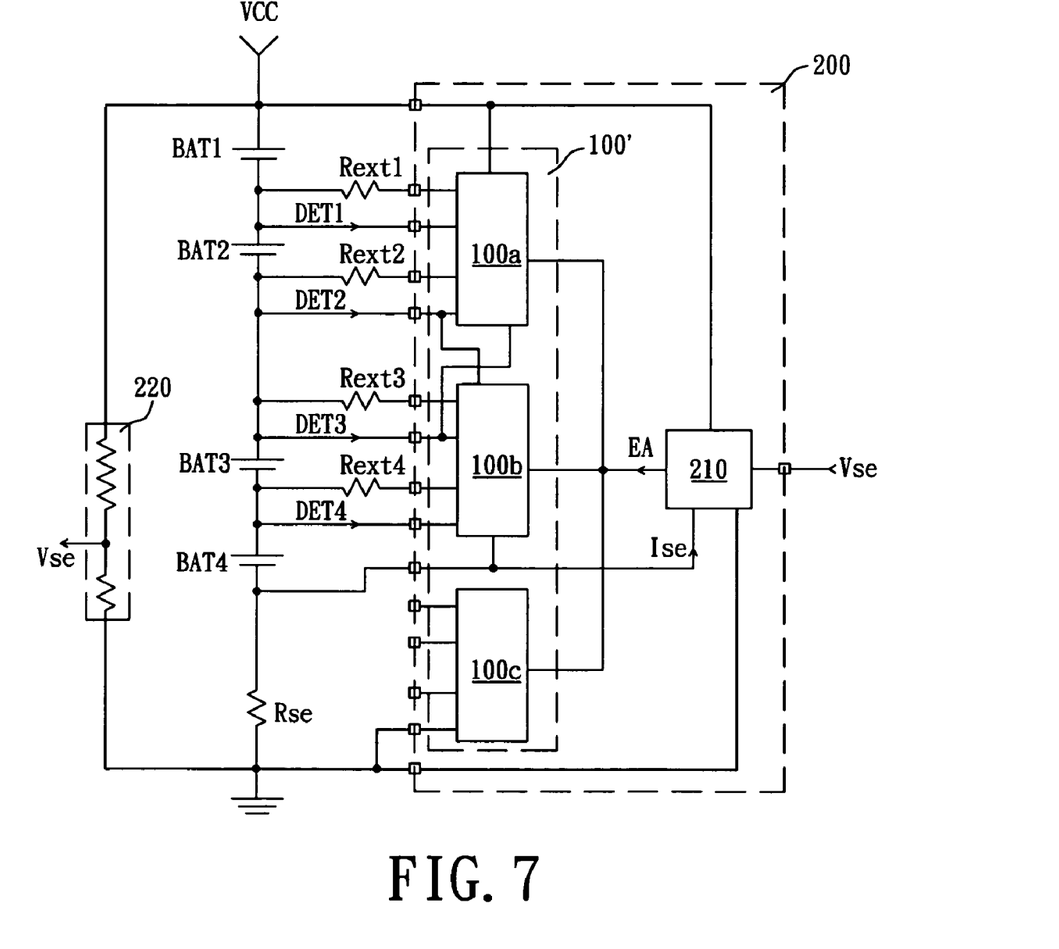
FIG. 7 is another schematic circuit diagram of a battery charging controller with a built-in battery balanced charging controller of the present invention.

Please refer FIG. 7, FIG. 7 is another schematic circuit diagram of a battery charging controller with a built-in battery balanced charging controller of the present invention for charging the first battery BAT1, the second battery BAT2, the third battery BAT3, and the fourth battery BAT4 connected in serial. The first battery balanced charging controller 100*a* and the second battery balanced charging controller 100*b* simultaneously detect the second battery BAT2 and the third battery BAT3. That is, one or more battery is simultaneously detected by two battery balanced charging controllers and so all batteries corresponding to the two battery balanced charging controllers could be charged with the function of battery balanced charging.

As described above, the present invention completely fulfills the three requirements on patent application: innovation, advancement and industrial usability. In the aforementioned texts the present invention has been disclosed by means of preferred embodiments thereof; however, those skilled in the art can appreciate that these embodiments are simply for the illustration of the present invention, but not to be interpreted as for limiting the scope of the present invention. It is noted that all effectively equivalent changes or modifications on these embodiments should be deemed as encompassed by the scope of the present invention. Therefore, the scope of the present invention to be legally protected should be delineated by the subsequent claims.

What is claimed is:

1. A battery balanced charging controller, for balancing a battery charge of a first battery and a second battery, with a negative terminal of the first battery being electrically coupled to a positive terminal of the second battery to form a connecting point, and a positive terminal of the first battery serving as a first terminal, and a negative terminal of the second battery serving as a second terminal, the battery balanced charging controller comprising:

a battery reference voltage generator coupled between the first terminal and the second terminal, for providing a first series of battery balance judgment signals and a second series of battery balance judgment signals, the first series of battery balance judgment signals comprising a high-plus reference signal and a low-plus reference signal, and the second series of battery balance judgment signals comprising a low-minus reference signal and a high-minus reference signal, wherein a voltage level of the high-plus reference signal is higher than that of the low-minus reference signal;

a voltage balance module comprising a first balance current unit and a second balance current unit, the first balance current unit coupled to the first terminal and the connecting point, and the second balance current unit coupled to the second terminal and the connecting point; and a balance judgment circuit coupled to the connecting point, the battery reference voltage generator and the voltage balance module, and determining whether to enter a first condition or a second condition according to the first series of battery balance judgment signals, the second series of battery balance judgment signals and a voltage level of the connecting point;

wherein the voltage balance module provides a balance current to one of the first battery and the second battery whichever is lower in voltage level when the balance judgment circuit is under the first condition.

2. The battery balanced charging controller according to claim 1, wherein the battery reference voltage generator further generates a balance reference signals as the low-plus reference signal and the high-minus reference signal, and a voltage level of the balance reference signal is substantially equal to an average of the voltage levels of the first battery and the second battery.

3. The battery balanced charging controller according to claim 1, wherein the balance judgment circuit enters the first condition when the voltage level of the connecting point is higher than that of the high-plus reference signal or lower than that of the low-minus reference signal, and enters the second condition when the voltage level of the connecting point is between the high-plus reference signal and the low-minus reference signal.

4. The battery balanced charging controller according to claim 3, wherein the battery reference voltage generator further generates a balance reference signal with a voltage level thereof being substantially equal to an average of the voltage levels of the first battery and the second battery, and the balance judgment circuit controls the voltage balance module to provide the balance current until the voltage level of the first battery is equal to that of the second battery when being under the first condition.

5. The battery balanced charging controller according to claim 1, wherein the first balance current unit comprises a first switch coupled to the first terminal and the connecting point, and the second balance current unit comprises a second switch coupled to the second terminal and the connecting point.

6. The battery balanced charging controller according to claim 5, wherein the balance judgment circuit comprises a first comparator and a second comparator, the first comparator compares the low-minus reference signal with the voltage level of the connecting point to output a first comparison signal, the second comparator compares the high-plus reference signal with the voltage level of the connecting point to output a second comparison signal, the balance judgment circuit generates a first control signal and a second control signal according to the first comparison signal and the second comparison signal to respectively control the first switch and the second switch, and thus the balance current flows through the first switch when the voltage level of the connecting point is lower than a voltage level of the low-minus reference signal and flows through the second switch when the voltage level of the connecting point is higher than a voltage level of the high-plus reference signal.

7. The battery balanced charging controller according to claim 6, wherein a resistor is coupled to the connecting point and the voltage balance module.

8. The battery balanced charging controller according to claim 6, further comprising a time delay unit coupled to the balance judgment circuit and the voltage balance module, such that one of the first switch and the second switch is conducted after a predetermined time period calculating from the other being cutoff.

9. The battery balanced charging controller according to claim 1, wherein the battery reference voltage generator comprises a first resistor, a second resistor, and a third resistor, the first resistor is coupled to the first terminal, the third resistor is coupled to the second terminal, and the second resistor is coupled to the first resistor to generate the high-plus reference signal and coupled to the third resistor to generate the low-minus reference signal, wherein a resistance value of the first resistor is equal to a resistance value of the third resistor and a resistance value of the second resistor is smaller than the resistance value of the first resistor.

10. The battery balanced charging controller according to claim 1, wherein the balance judgment circuit enters the first condition when the voltage level of the connecting point is higher than that of the high-plus reference signal or lower than that of the low-minus reference signal, and enters the second condition when the voltage level of the connecting point is between that of the high-minus reference signal and that of the low-plus reference signal.

11. A battery charging controller for charging a battery module with a plurality of battery units, the battery charging controller coupled to a positive terminal and a negative terminal of each battery units, the battery charging controller comprising:

a battery charging controlling unit for determining an amount of a charging current and generating an enable signal according to a battery current detecting signal and a battery voltage detecting signal indicative of a current and a voltage of the battery module, respectively; and a battery balanced charging controlling unit coupled to the battery charging controlling unit and a positive terminal and a negative terminal of each of the battery units of the battery module, the battery balanced charging controlling unit comparing the voltages of N battery units connected in series for determining which battery unit among the N battery units connected in series having the lowest voltage and which battery unit among the N battery units having the highest voltage, and determining whether to modulate the amount of the charging current flowing through any N battery units connected in series in the battery module according to the voltages of the N battery units connected in series when receiving the enable signal, to cause that the charging current flowing through the battery unit with the lowest voltage among the N battery units connected in series is larger than that flowing through the battery unit with the highest voltage among the N battery units connected in series, wherein N is an integer greater than zero.

12. The battery charging controller according to claim 11, wherein the battery balanced charging controlling unit starts to modulate the amount of the charging current when a voltage difference between the battery unit with the lowest voltage and the battery unit with the highest voltage of the N battery units connected in series is more than a predetermined percentage.

13. The battery charging controller according to claim 12, wherein the battery balanced charging controlling unit stops modulating the amount of the charging current when the voltage difference between the battery unit with the lowest voltage and the battery unit with the highest voltage of the N battery units connected in series is zero.

14. The battery charging controller according to claim 11, wherein the battery charging controlling unit has a first charging mode and a second charging mode and an average of the charging currents in the first charging mode is larger than that in the second charging mode.

15. The battery charging controller according to claim 14, wherein the battery charging controlling unit generates the enable signal only in the first charging mode or only in the second charging mode.

16. The battery charging controller according to claim 14, wherein the first charging mode is a constant current charging mode and the second charging mode is a constant voltage charging mode, or the first charging mode is a constant voltage charging mode and the second charging mode is a constant current charging mode.

17. The battery charging controller according to claim 12, wherein the battery balanced charging controlling unit comprises at least two battery balanced charging controllers for controlling the charging current flowing through the corresponding N battery units connected in series.

18. The battery charging controller according to claim 17, wherein at least one battery unit corresponds to two batteries balanced charging controllers.

19. A battery balanced charging controller, for modulating charging currents flowing through a plurality of battery units connected in series of a battery module, comprising:

a battery reference voltage generator coupled to positive terminals and negative terminals of the plurality of the battery units for providing plural series of battery balance judgment signals, each series of the battery balance judgment signals comprising a high-plus reference signal, a low-plus reference signal, a low-minus reference signal, and a high-plus reference signal, with a voltage level of the high-plus reference signal being largest among voltage levels of the high-minus reference signal, the low-plus reference signal, and the low-minus reference signal and the voltage level of the low-minus reference signal being smallest;

a voltage balance module coupled to connecting points of every two of the battery units connected in series, a positive terminal and a negative terminal of the battery module; and a balance judgment circuit coupled to the connecting points, the battery reference voltage generator and the voltage balance module, the balance judgment circuit determining whether to modulate the charging current of each of the battery units according to voltage levels of the connecting points and voltage levels of the plural series of the battery balance judgment signals;

wherein the balance judgment circuit modulates the charging currents of any two of the battery units when the voltage level of the connecting point is higher than that of the corresponding high-plus reference signal or lower than that of the corresponding low-minus reference signal, and stops modulating the charging currents of any two of the battery units when the voltage level of the connecting point is between that of the corresponding high-minus reference signal and that of the corresponding low-plus reference signal.

20. The battery balanced charging controller according to claim 19, further comprising a plurality of resistors coupled to corresponding connecting points and the voltage balance module.

* * * * *